(12) United States Patent
Lee et al.

(10) Patent No.: US 6,310,923 B1
(45) Date of Patent: Oct. 30, 2001

(54) DEVICE AND METHOD FOR DATA ENCODING AND FREQUENCY DIVERSITY IN MOBILE COMMUNICATIONS SYSTEM

(75) Inventors: Kwang-Wook Lee; Soon-Young Yoon; Jae-Min Ahn; Young-Ky Kim; Hee-Won Kang; Seung-Hyun Kong, all of Seoul; Ha-Bong Chung; Jong-Seon No, both of Kyonggi-do; Kyeong-Cheol Yang, Seoul, all of (KR)

(73) Assignee: Samsung Electronics Company, Ltd. (KR)

( * ) Notice: Subject to any disclaimer, the term of this patent is extended or adjusted under 35 U.S.C. 154(b) by 0 days.

(21) Appl. No.: 09/152,019

(22) Filed: Sep. 11, 1998

(30) Foreign Application Priority Data

Sep. 11, 1997 (KR) .................................... 97-46711

(51) Int. Cl.[7] .............................. H40B 7/02; H40B 15/00; H40L 1/02; H40L 27/30
(52) U.S. Cl. ............................ 375/267; 375/200; 370/529
(58) Field of Search ............................... 375/267.39, 200; 370/529

(56) References Cited

U.S. PATENT DOCUMENTS

| | | | |
|---|---|---|---|
| 5,305,352 | * 4/1994 | Calderbank et al. | 375/39 |
| 5,479,448 | * 12/1995 | Seshadi | 375/267 |
| 5,825,807 | * 10/1998 | Kumar | 375/200 |
| 6,115,427 | * 9/2000 | Calderbank et al. | 375/267 |

OTHER PUBLICATIONS

Francois Gagnon, and David Haccoun, on the Performance of Error Control Coding with Diversity for Mobile Channels, IEEE 1992, pp. 488–495.*

Guilermo E. Atkin, and Hector P. Corrales, An Efficient Modulation/Coding Sheme for MFSK Systems on Bandwidth Constrained Channels, IEEE 1989, pp. 1396–1401.*

* cited by examiner

Primary Examiner—Stephen Chin
Assistant Examiner—Tony Al-Beshrawi
(74) Attorney, Agent, or Firm—Dilworth & Barrese, LLP

(57) ABSTRACT

A code set generating method in a mobile communications system having Nf frequency channels and Np phase channels. In the method, a code length Nc is obtained by Nf×Np, a minimum distance Nd between codewords in a code set and frequency diversity Nfd are determined, code sets are detected according to Nc, Nd, and Nfd, a code set is selected, which shows such a Hamming distance distribution among code words that minimizes demodulation errors from the detected code sets, and the code set is stored in a mapping table of a demodulator.

10 Claims, 3 Drawing Sheets

DEVICE AND METHOD FOR DATA ENCODING AND FREQUENCY DIVERSITY IN MOBILE COMMUNICATIONS SYSTEM

BACKGROUND

1. Technical Field

The present application relates generally to a mobile communications system and, in particular, to a device and method for encoding transmission data to achieve frequency diversity.

2. Description of the Related Art

Generally, in a mobile communications system, voice or data is subject to channel encoding for radio transmission and reception. On a forward link, for example, voice or data to be transmitted is channel-encoded and modulated using modulation techniques such as QPSK (Quadrature Phase Shift Keying). Channel encoding is generally performed for data transmission in a single frequency, and encoded symbols are BPSK (Binary Phase Slift Keying)/QPSK modulated prior to transmission. If a plurality of frequencies and phase channels are available to a user for high-speed data transmission, however, there is a need for assigning transmission data symbols to the plurality of channels.

Conventionally, data symbols are distributed to a plurality of channels for transmission. Advantageously, this method enables optimal data transmission capacity for each channel, but has limitations in recovering data due to possible channel failure or loss of transmission data. The lost data may be recovered by reinforcing data encoding, but with a decrease in transmission efficiency on multiple channels. In addition, when a channel is or remains defective, the channel is either not used or less frequently used until it is recovered. Therefore, communication service quality becomes poor beyond remedy.

These problems can be solved by transmitting the same data on a plurality of frequencies and phase channels. Despite possible failures in some of channels, the data transmitted on the other channels are safe, thereby providing a reliable communication link. Unfortunately, this method significantly decreases channel use efficiency. In particular, since channel encoding and assignment of frequencies and phase channels are independently performed in the conventional technology, it is impossible to consider channel use efficiency when performing data encoding.

SUMMARY OF THE INVENTION

It is an object of the present invention to provide a device and method for converting channel-encoded symbols to code words, taking into consideration channel use efficiency and characteristics of a plurality of frequencies and phase channels, and transmitting the code words via a plurality of channels in a mobile communications system.

It is another object of the present invention to provide a device and method for detecting a code set with a desired minimum distance between code words in order to convert transmission data to code words in a mobile communications system.

It is a further object of the present invention to provide a device and method for selecting the best code set from a plurality of detected code sets in a mobile communications system, and transmitting the selected code set.

To achieve these and other objects, a method is provided for generating a code set in a mobile communications system having Nf frequency channels and Np phase channels. In the method, a code length Nc is obtained by Nf×Np, a minimum distance Nd between codewords in a code set and frequency diversity Nfd are determined, code sets are detected according to Nc, Nd, and Nfd, a code set is selected, which shows such a Hamming distance distribution among code words that minimize demodulation errors from the detected code sets, and the code set is stored in a mapping table of a demodulator.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
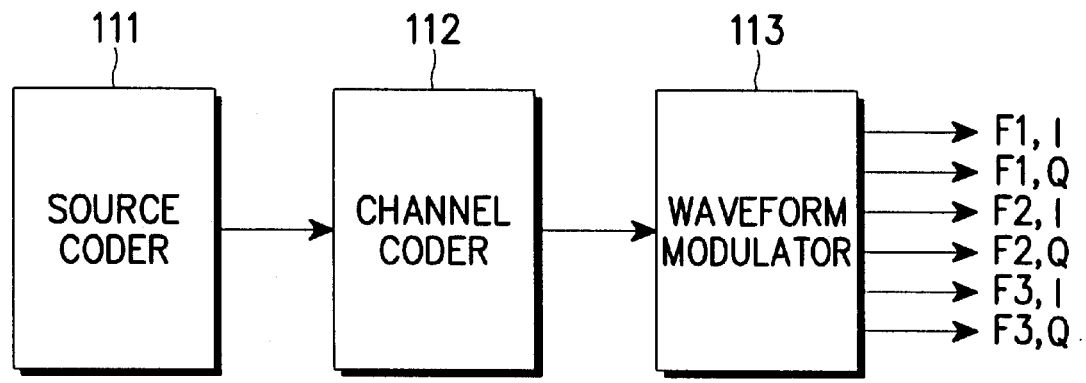
FIG. 1 is a block diagram which illustrates a transmitter on a forward link in a mobile communications system.

The present invention is directed to a method for providing data encoding and frequency diversity in a digital mobile communications system such as a CDMA (Code Division Multiple Access) cellular system or PCS (Personal Communications System). Specifically, the present invention is directed to a mobile communications system using channel encoding and multicarrier transmission designed to enable effective information transmission and reception by efficiently assigning data and code symbols to available frequencies and phase resources in a communication environment in which channels are susceptible to errors due to fading.

A transmitter in a mobile communications system according to an embodiment of the present invention includes an algorithm for detecting a code set under given conditions. A method for constructing codewords according to a given number of frequencies and phase channels in accordance with one aspect of the present invention will first be described. Assuming the number of given frequency channels and phase channels are Nf and Np, respectively, and assuming that requirements for frequency-multiplexing and phase-multiplexing transmission data are Mf and Mp, respectively, the number of available channels is determined by Nf×Np. This implies that a maximum code length Nc is Nf×Np. Then, for a minimum distance between codewords ("dmin")=Nd, a code set satisfying the following conditions is detected.

The number of codewords (depending on the number of phase channels) is $2^{Np}$. When, for instance, Np=2 in a QPSK system, four codewords can be obtained: {00, 01, 10, 11}={a, b, c, d}. In addition, the number of codewords (depending on frequency diversity) is $2^{Nf}$. For example, eight codewords can be generated when Nf=3.

If the phase channels and frequency channels are operative together, the length of a codeword is (Nf×Np), and $2^{Nf \times Np}$ codewords can be generated in a code set. For example, assuming Nf=3 and Np=2, a code set having 64 codewords can be constructed. By utilizing a code set having dmin=2 to reduce demodulation errors in a receiver, the reliability of codeword modulation/demodulation can be increased, virtually bringing about channel encoding effects. The size (the number of codewords) of the code set having dmin=2 is $2^{Nf \times Np}/2$. Hence, $2^{Nf \times Np}/Nd$ codewords are available in modulation with a code set having dmin=2=Nd. Since $2^N=2^{Nf \times Np}/2$, the channel encoding efficiency at a demodulator can be determined from N/[(NfxNp)/Nd].

The following examples illustrate code sets which are constructed to satisfy the conditions discussed above.

I. Three Frequencies

1. Assume that Nf=3, Np=2 (I and Q), dmin=2, and frequency diversity≧2. The length of a codeword is equal to 6 bits (i.e., NfxNp) and four codewords are available for the two phase channels per frequency: {00, 01, 10, 11}={a, b, c, d}. Then, codewords for the three frequencies (Nf=3) can be designed as follows:

Codewords starting with symbol "a" are:

aaa={00 00 00}
abb=(00 01 01}
acc={00 10 10}
add={00 11 11}

Next, codewords starting with symbol "b" are obtained by fixing the second symbols in the order of a, b, c, d, and then permuting the third symbols in an order which is different than the order of the third symbols in the codewords starting with symbol "a". It is to be understood that the number of available third symbol arrangements is equal to a total number of permutations minus the permutation corresponding to the third symbol arrangement in the codewords starting with symbol "a". This is expressed as follows:

baX={01 00 xx}
bbX={01 01 xx}
bcX={01 10 xx}
bdX={01 11 xx}

Similarly, codewords starting with symbol "c" can be generated by fixing the second symbols in the order of a, b, c, d, and then permuting the third symbols in an order which is different from the orders of the third symbols in the codewords starting with symbol "a" and the codewords starting with symbol "b". This is illustrated by the following:

caX={10 00 xx}
cbX={10 01 xx}
ccX={10 10 xx}
cdX={10 11 xx}

Codewords starting with symbol "d" can be generated in a similar manner, as demonstrated by the following:

daX={11 00 xx}
dbX={11 01 xx}
dcX={11 10 xx}
ddX={11 11 xx}

Accordingly, a plurality of code sets can be generated. For example, a code set can be as follows:

aaa={00 00 00}
abb={00 01 01}
acc={00 10 10}
add={00 11 11}
bab={01 00 01}
bbc={01 01 10}
bcd={01 10 11}
bda={01 11 00}
cac={10 00 10}
cbd={10 01 11}
cca={10 10 00}
cdb={10 11 01}
dad={11 00 11}
dba={11 01 00}
dcb={11 10 01}
ddc={11 11 10}

It is most effective to apply an optimum code set taken from the code sets resulted from the above procedure to a mobile communications system, and the effectiveness criterion is a Hamming distance distribution among codewords. Specifically, the optimum code set exhibits a Hamming distance distribution which minimizes demodulation errors.

2. Assume that Nf=3, Np=2 (I and Q), dmin=3, and frequency diversity=3. The length of a codeword is 6 bits (i.e., NfxNp) and four codewords are available for the two phase channels per frequency: {00, 01, 10, 11}={a, b, c, d}.

Then, codewords for the three frequencies can be designed as follows. If a codeword starts with symbol "a", any other code in a code set cannot not start with symbol "a". This rule is similarly applied to the second and third symbols. This is demonstrated by the following:

aaa={00 00 00}
bbb=(01 01 01}
ccc={10 10 10}
ddd={11 11 11}

Next, a plurality of code sets can be derived from the above code set by permutation as follows:

aXX={00 xx xx}
bXX={01 xx xx}
cXX={10 xx xx}
dXX={11 xx xx}, where the second and third symbols can be produced by permuting the order of symbols a, b, c, d.

A different example of code set is as follows:

abc={00 01 10}
bcd={01 10 11}
cda={10 11 00}
dab={11 00 01}

3. Assume Nf=3, Np=2, and dmin=3. For frequency diversity=2, a code set size is 4 and given as:

aaa={00 00 00}
adb={00 11 01}
dda={11 11 00}
dab={11 00 01}

Assuming a frequency diversity≧2, a code set of size 8 and six code sets can be produced as follows:

Code Set #1 aaa={00 00 10}
adb={00 11 01}
bdc={01 11 10}
bad={01 00 11}
cbc={10 01 10}
ccd={10 10 11}
dbb={11 01 01}
dca={11 10 00}

Code Set #2 aaa={00 00 00}
adb={00 11 01}
bdc={01 11 10} bad={01 00 11}
cbd={10 01 11}
ccc={10 10 10}
dba={11 01 00}
dcb={11 10 01}

Code Set #3
aaa={00 00 00}
adb={00 11 01}
bbc={01 01 10}
bcd={01 10 11}
cad={10 00 11}
cdc={10 11 10}
dbb={11 01 01}
dca={11 10 00}

Code Set #4
aaa={00 00 00}
adb={00 11 01}
bbc={01 01 10}
bcd={01 10 11}
cbd={10 01 11}
ccc={10 10 10}
dab={11 00 01}
dda={11 11 00}

Code Set #5
aaa={00 00 00}
adb={00 11 01}
bbd={01 01 11}
bcc={01 10 10}
cad={10 00 11}
cdc={10 11 10}
dba={11 01 00}
dcb={10 01 01}

Code Set #6
aaa={00 00 00}
adb={00 11 01}
bbd={01 01 11}
bcc={01 10 10}
cbc={10 01 10}
ccd={10 10 11}
dab={11 00 01}
dda={11 11 00}

II. Six Frequencies

The number of available frequencies is not limited to three and can be six on a multicarrier forward link. Thus, code sets for six frequencies can be designed in consideration of frequency diversity, as follows:

{a, b, c, d}={00, 01, 10, 11} is also used in building code sets for six frequencies.

1. Frequency diversity exists, and dmin=2.

A total number of codewords is $4^5$. A codeword is expressed as e1 e2 e3 e4 e5 e6 and e4 e5 e6 are determined from e1 e2 e3. Then, the following three-frequency sets are made.

aaa bab cac dad
SA={abb bbc cbd dba}
    acc bcd cca dcb
    add bda cdb ddc aba bbb cbc dbd
SB={acb bcc ccd dca}
    adc bdd cda ddb
    aad baa cab dac aca bcb ccc dcd
SC={adb bdc cdd dda}
    aac bad caa dab
    abd bba cbb dbc ada bdb cdc ddd
SD={aab bac cad daa}
    abc bbd cba dbb
    acd bca ccb dcc If the first three symbols of e1 e2 e3 e4 e5 e6 belong to SA, the last three symbols are selected from SA. A code set size is $4^5$ when codewords are generated in this manner.

2. Frequency diversity=6

Since a codeword has different code symbols in every symbol position, a code set size is 4. To maximize the distance between codewords, symbol distance should be considered. For four codewords, a codeword distance is six symbols and 01, 10, 11 occur twice respectively regardless of symbol positions in the six symbols. Since four of the six symbols have weight 1s and the other two symbols have weight 2s, the six symbols are composed of four symbols having weight is and two symbols having weight 2s to maximize the codeword distance. This is demonstrated as follows:

c1+c2=>{01 01 10 10 11 11}
c2+c3=>{10 10 11 11 01 01}
c1+c3=>{11 11 01 01 10 10}
c1+c4=>{10 10 11 11 01 01}
c2+c4=>{11 11 01 01 10 10}
c3+c4=>{01 01 10 10 11 11}

For example, when c1=00 00 00 00 00 00, the code set is c1=00 00 00 00 00 00
c2=01 01 10 10 11 11
c3=11 11 01 01 10 10
c4=10 10 11 11 01 01 where the code set size is 4 and dmin=8.

3. Frequency diversity≧5

A total of 12 bits are grouped into 4 bits. That is, if symbols are a0, a1, a2, ..., a15, each symbol of a codeword (ai aj ak) is different from any other symbol in view of the given frequency diversity. Although a code size is 16, it cannot be said that the frequency diversity≧5 with all codewords each having different symbols. Therefore, an actual code set size is 8 and a code set is as follows:

aaaaaa
abbbbb
bacccc
bbdddd
ccabcd
cdbcda
dccdab
dddabc

4. Frequency diversity≧4

The first three symbols in a codeword are different, and the number of codewords in a code set is smaller than $4^3$. A code set having 32 ($2\times4^2$) codewords is constructed in the following procedure.

First, 16 codewords are generated by SA+SA, that is, repeating the 16 codewords in SA once.

aaaaaa
babbab
caccac
daddad abbabb
bbcbbc
cbdcbd
dbadba accacc
bcdbcd
ccacca
dcbdcb addadd
bdabda
cdbcdb
ddcddc Then, the other 16 codewords are generated by SB+SB*. SB* is achieved by changing the order of symbols in SB.

ccd dca acb bcc
SB*={cda ddb adc bdd}
cab dac aad baa
cbc dbd aba bbb
The other 16 codewords are as follows:
abaccd
bbbdca
cbcacb
dbdbcc acbcda
bccddb
ccdadc
dcabdd adccab
bdddac
cdaaad
ddbbaa aadcbc
baadbd
cababa
dacbbb Thus, a total of 32 codewords are produced.

An exemplary application of the above code set generating method to a waveform modulator on a multicarrier forward link will now be discussed with reference to FIG. 1, which is a block diagram illustrating a transmitter on a forward link in a mobile communications system. In FIG. 1, a source coder 111 encodes input data, and a channel coder 112 channel-encodes the data received from the source coder 111 and spreads the channel-encoded data. A waveform modulator 113 converts the spread data received from the channel coder 112 to codewords taken from a predetermined code set. The present invention is related to the waveform modulator 113 of FIG. 1.

Figure 2:
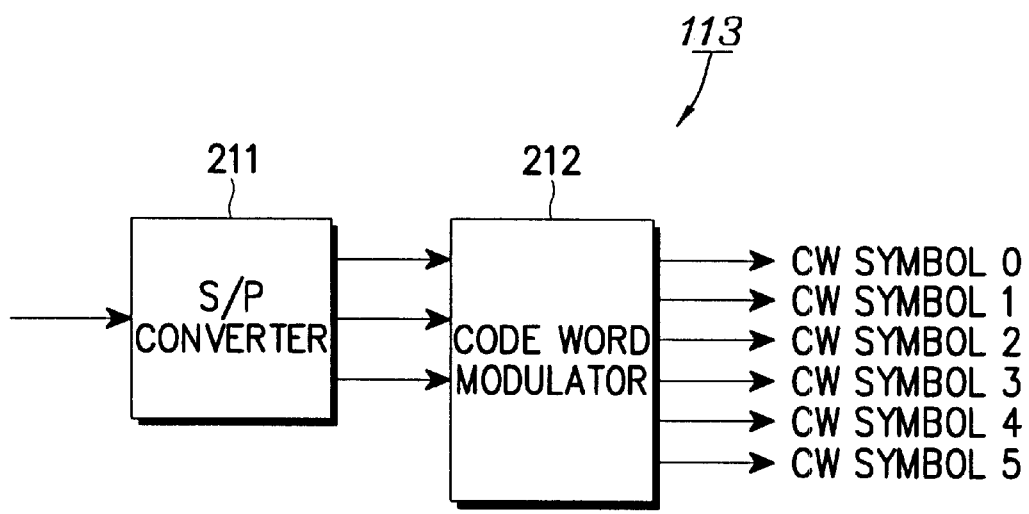
FIG. 2 is a block diagram which illustrates a waveform modulator shown in FIG. 1.

Referring now to FIG. 2, a block diagram illustrates an embodiment of the waveform modulator 113 shown in FIG. 1. In FIG. 2, a serial-to-parallel converter 211 converts the data received from the channel coder 112 to parallel data, and a codeword modulator 212 maps the parallel data to corresponding codewords in a predetermined method. The codeword modulator 212 is shown in FIG. 2 to modulate three input bits to six codeword symbols F1I, F1Q, F2I, F2Q, F3I, and F3Q. The waveform modulator 113 shown in FIG. 2 can map N-bit input data to an M-symbol output codeword. In particular, the codeword modulator 212 converts the N-bit input data to the M-symbol codeword.

Figure 3:
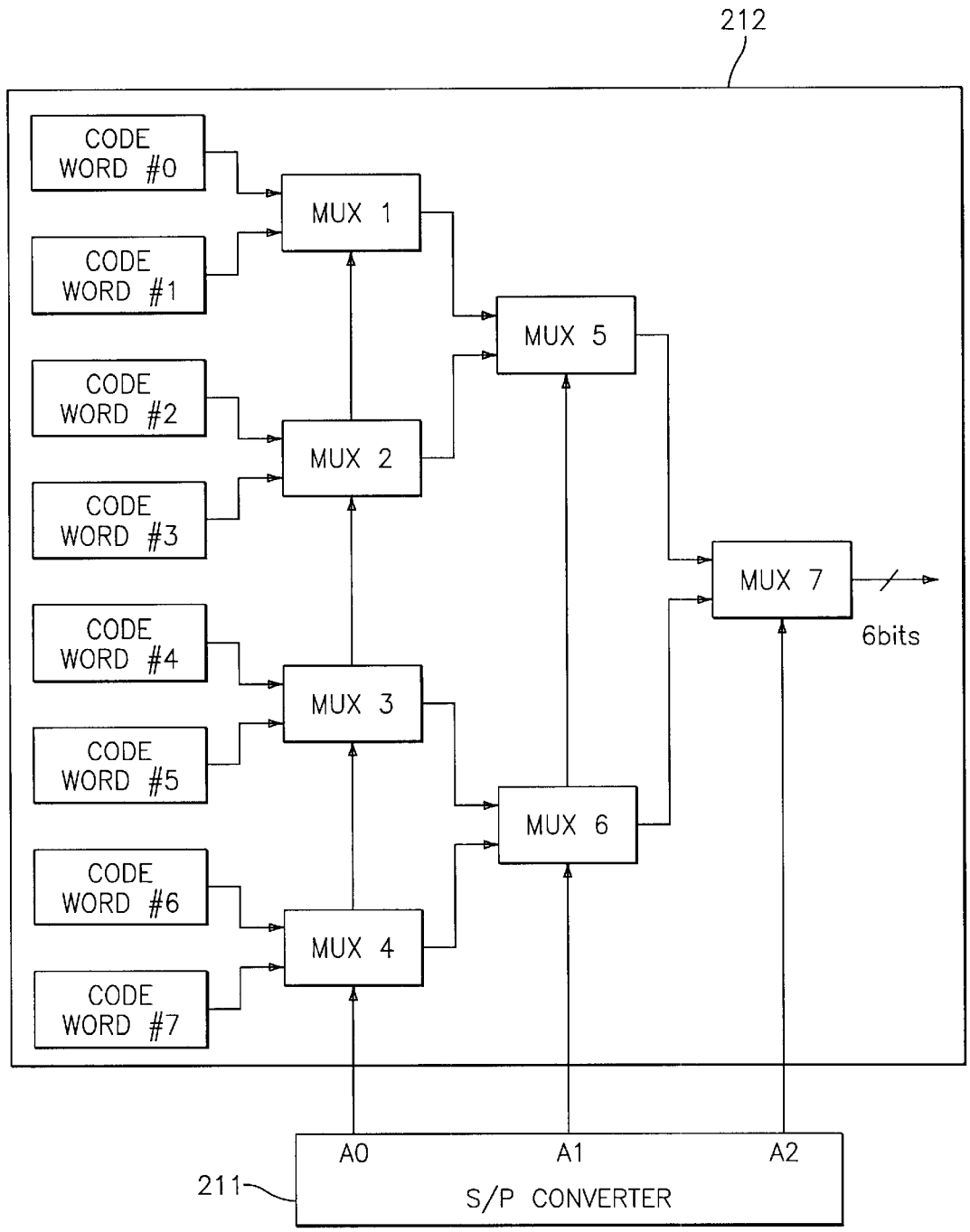
FIG. 3 is a block diagram which illustrates elements of the waveform modulator in accordance with an embodiment of the present invention.

Referring now to FIG. 3, a block diagram illustrates a hardware realization of the codeword modulator 212 of FIG. 2. In the codeword modulator 212, three-bit input data (A0 A1 A2) is converted to a codeword with six symbols selected from eight codewords (Code Word#0–Code Word#7). Specifically, the serial-to-parallel converter 211 converts input data to three-bit data (A0 A1 A2). The codeword modulator 212 includes eight codewords #0–#7, and multiplexers MUX1–MUX7 for selecting a corresponding codeword from the eight codewords according to the three bits A0–A2 received from the serial-to-parallel converter 211. It is to be appreciated that the above method can be adapted to output an M-symbol codeword for the N-bit input data.

Figure 4:
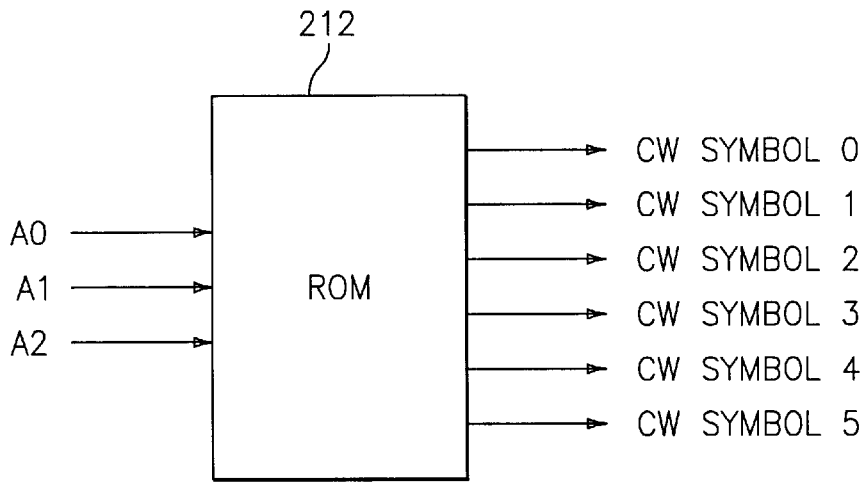
FIGS. 4 and 5 are diagrams which illustrate additional embodiments of the waveform modulator in accordance with the present invention.

Referring now to FIG. 4, a diagram illustrates a ROM being used as the codeword modulator 212 for outputting a six-symbol codeword for three-bit input data A0–A2. Assuming a codeword mapping table is stored in the ROM of FIG. 4, the N-bit data can be converted to the M-symbol codeword.

It is to be appreciated that various code sets can be generated depending on dmin and frequency diversity requirements. These code sets can be applied to a waveform modulator on a multicarrier forward link, such as a forward link modulator in a CDMA cellular system, PCS, or IMT-2000, thereby achieving coding gains and frequency diversity at the same time.

By using the codesets that are generated in accordance with the methods described herein to transmit data on a multicarrier forward link with three frequency channels and I and Q phase channels, frequency diversity can be efficiently achieved. Since transmission channels can be used without the need for distinguishing frequencies and phase channels in the frequency diversity scheme, data transmission efficiency is increased. Furthermore, it is possible to set an appropriate ratio of a data transmission rate to frequency diversity. Therefore, channel coding gain requirements in other parts of a system can be reduced by means of a modulator using the above codesets, and a waveform modulator can be realized, which has a high coding rate with maximum frequency diversity and dmin.

It is to be appreciated that the concept of the above method for generating codesets regardless of frequencies and phases can be applied to generation of multi-symbol block codes.

When there are three frequency channels and two phase channels, the six channels are basically assigned to one symbol. The multi-symbol block code scheme refers to assigning symbols to a total of 12 channels derived from three frequency channels, two phase channels, and two time slots. For 12 channels, code sets can be designed in which the distance between codewords is set to be large in consideration of frequency diversity. With these multi-symbol block codes, frequency multiplexing, time multiplexing, and coding gains can be achieved all together.

When codeword symbols are generated using frequency, phase, and time, the entire channels are as follows:

[f1-I f1-Q f2-I f2-Q f3-I f3-Q f1-I f1-Q f2-I f2-Q f3-I f3-Q]

The codewords are constructed for the above channels in consideration of frequency multiplexing and dmin. For example, assuming that the number of channels is 12, dmin=2, and frequency diversity≧2, the number of available codewords is $2^{10}$. If dmin is increased according to coding gain requirement, 10 or less symbol bits can be transmitted but the distance between codewords increases, thereby facilitating demodulation. It is to be understood that a detailed description for generating a code set for the 12 channels will be omitted because the code set generating method can be inferred from the above-described examples.

Figure 5:
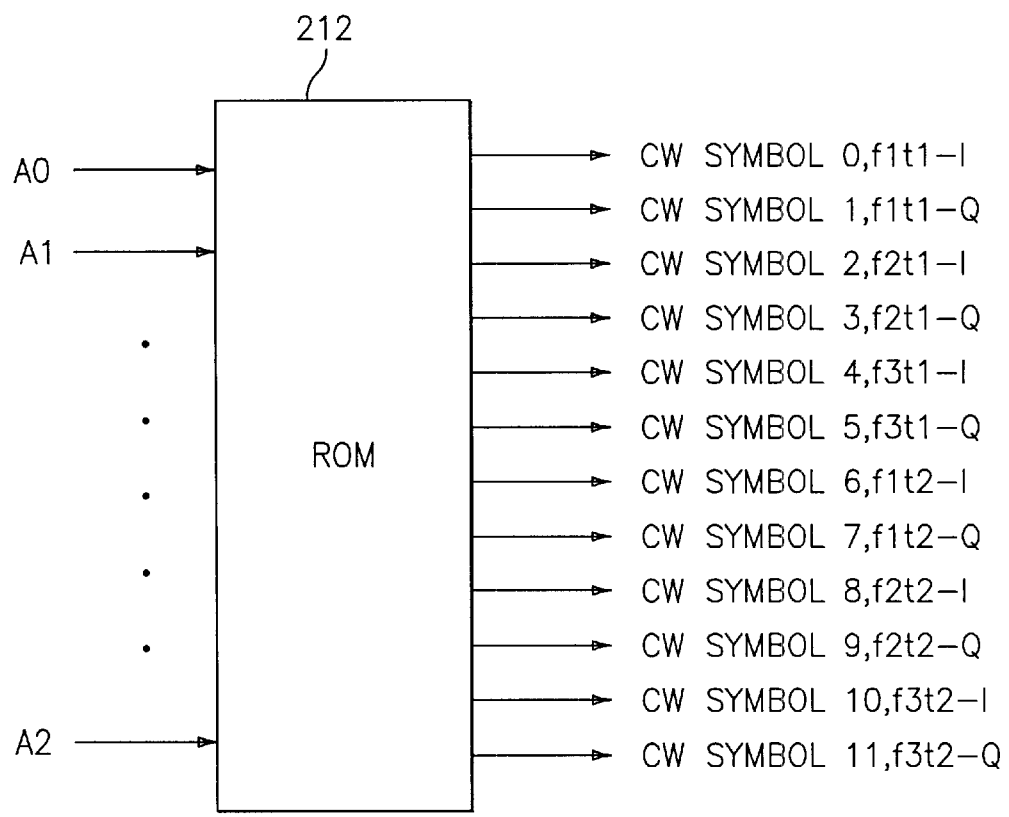

Referring now to FIG. 5, a diagram illustrates a ROM being used as a modulator in which data is block-encoded for three frequency channels, two phase channels, and two time channels, all of which are used together. The codeword modulator 212 of FIG. 5 generates 12 output codeword symbols. Here, f1t1-I represents a codeword symbol transmitted in frequency f1, time slot t1, and phase channel I, and f3t2-Q represents a codeword symbol transmitted in frequency f3, time slot t2, and phase channel Q. It is to be appreciated that the codeword modulator illustrated in FIG. 5 can be implemented in a communications system using a plurality of frequency channels, phase channels, or time channels, such as a CDMA cellular system, PCS, and IMT-2000 system.

The application of data encoding and modulation together to a transmission system in accordance with the present invention increases the effects of frequency diversity in a communication environment which is affected by fading with various frequencies, and allows dynamic data encoding and modulation in any situation between the extremes of no multiplexing with a high data transmission rate and multiplexing to every frequency channel with a low data transmission rate. In addition, since a plurality of phase channels and frequency channels are used together, the demodulation efficiency of a receiver is increased.

In the preferred embodiment of the present invention as described above, system capacity and power use efficiency as well as encoding and modulation efficiency are increased by dynamically applying data encoding and modulation to a transmission/reception system using a plurality of frequencies and phase channels in accordance with characteristics of the frequencies and phase channels.

While the present invention has been described in detail with reference to the specific embodiment, it is a mere exemplary application. Thus, it is to be clearly understood that many variations can be made by anyone skilled in the art within the scope and spirit of the present invention.

What is claimed is:

1. A method for generating a code set for use in a mobile communications system having Nf frequency channels and Np phase channels, comprising the steps of:

determining a code length Nc from said Nf and Np;

setting a minimum distance Nd between codewords in a code set and setting frequency diversity Nfd;

detecting code sets in accordance with Nc, Nd, and Nfd; and selecting a code set having a Hamming distance distribution among code words which minimizes demodulation errors from the detected code sets; and storing said selected code set in a mapping table of a demodulator.

2. The method of claim 1, wherein Nc=Nf×Np.

3. A device for generating a code set in a mobile communications system having Nf frequency channels and Np phase channels, comprising:

means for determining a code length Nc from said Nf and said Np;

means for setting a minimum distance Nd between codewords in a code set, setting frequency diversity Nfd, and detecting code sets in accordance with Nc, Nd, and Nfd; and means for selecting a code set having a Hamming distance distribution among code words which minimizes demodulation errors from the detected code sets, and storing the code set in a mapping table of a demodulator.

4. The device of claim 3, wherein Nc=Nf×Np.

5. A transmitter in a mobile communications system, comprising:

a source coder for encoding transmission data;

a channel coder for channel-encoding the output of the source coder;

a waveform modulator for mapping the channel-encoded data to corresponding code words, including a serial-to-parallel converter for converting the channel-encoded data to parallel data, and a codeword modulator having a code set table which stores a predetermined code set, whereby said codeword modulator address-maps the parallel data and selects corresponding codewords from said code set table; and a transmitting portion for transmitting a codeword received from the waveform modulator on a plurality of channels;

wherein said codewords of said code set table have a code length equal to the product of a number of available frequencies and a number of available phase channels in said communication system.

6. The transmitter of claim 5, wherein said codewords of said code set table have a code length equal to the product of a number of available frequencies, a number of available phase channels, and a number of available time slots in said communication system.

7. A method for transmitting data in a mobile communications system, comprising the steps of:

encoding source data to be transmitted;

channel-encoding the encoded source data;

converting the channel-encoded data to parallel data;

address-mapping the parallel data in a code set table;

selecting a corresponding codeword from said code set table and modulating the waveform of the selected codeword; and transmitting the waveform-modulated codeword on as many channels equal to the product of a number of available frequency channels and a number of available phase channels in said communications system.

8. The method of claim 7, wherein each of said codewords of said code set table have a length equal to the product of said number of available frequency channels and said number of available phase channels.

9. The method of claim 7, wherein said waveform-modulated codeword is transmitted on as many channels equal to the product of said number of available frequency channels, said number of available phase channels, and a number of designated time slots of said communications system.

10. The method of claim 9, wherein each of said codewords of said code set table have a length equal to the product of said number of available frequency channels, said number of available phase channels, and said number of designated time slots.

* * * * *